United States Patent [19]

Shinohara

[11] Patent Number: 4,580,883

[45] Date of Patent: Apr. 8, 1986

[54] PROGRESSIVE MULTIFOCAL OPHTHALMIC LENSES

[75] Inventor: Toshihide Shinohara, Suwa, Japan

[73] Assignee: Kabushiki Kaisha Suwa Seikosha, Tokyo, Japan

[21] Appl. No.: 327,288

[22] Filed: Dec. 3, 1981

[30] Foreign Application Priority Data

Dec. 5, 1980 [JP] Japan .................................. 55-171569
Dec. 12, 1980 [JP] Japan .................................. 55-175601

[51] Int. Cl.⁴ ................................................. G02C 7/06
[52] U.S. Cl. ..................................................... 351/169
[58] Field of Search ........................... 351/159, 168–172

[56] References Cited

U.S. PATENT DOCUMENTS 4,253,747 3/1981 Maitenaz .............................. 351/169
4,315,673 2/1982 Guilino et al. ...................... 351/169

Primary Examiner—John K. Corbin
Assistant Examiner—Scott J. Sugarman
Attorney, Agent, or Firm—Blum Kaplan Friedman Silberman and Beran

[57] ABSTRACT

Ophthalmic lenses wherein the curvature of the refractive surface changes along the principal meridian between the optical center of a far vision viewing zone and the optical center of a near vision viewing zone in accordance with a predetermined law is provided. The refractive surfaces of the lenses are divided into a far vision viewing zone, an intermediate vision viewing zone and a near vision viewing zone by a curve which intersects the principal meridian curve at the optical center of the far vision viewing zone and a second curve which intersects the principal meridian curve at the optical center of the near vision viewing zone. An angle made by a line normal to the refractive surface from each point of an intersection of an arbitrary plane which is parallel to a plane including the principal meridian curve and the refractive surface of the lens and a plane including the principal meridian curve is constant in the far vision viewing zone and in the near vision viewing zone. The angle changes in accordance with the same law as that of the curvature of the refractive surface between the optical center of the far vision viewing zone and the optical center of the near vision viewing zone along the principal meridian curve in the intermediate vision viewing zone.

13 Claims, 31 Drawing Figures

FIG.3
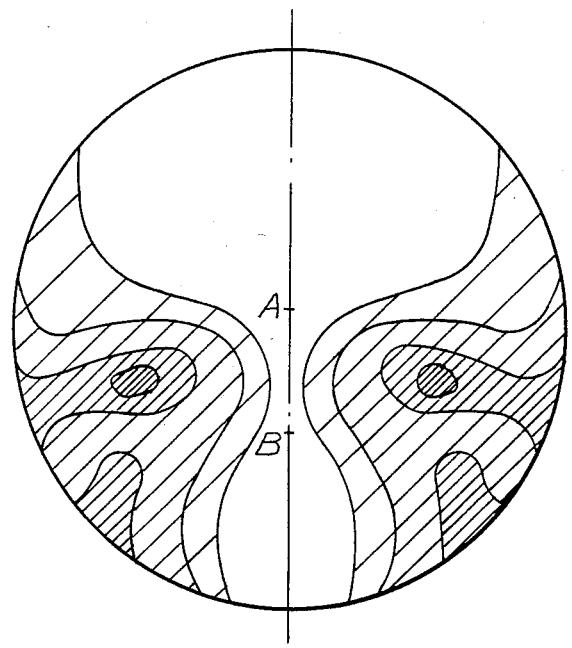
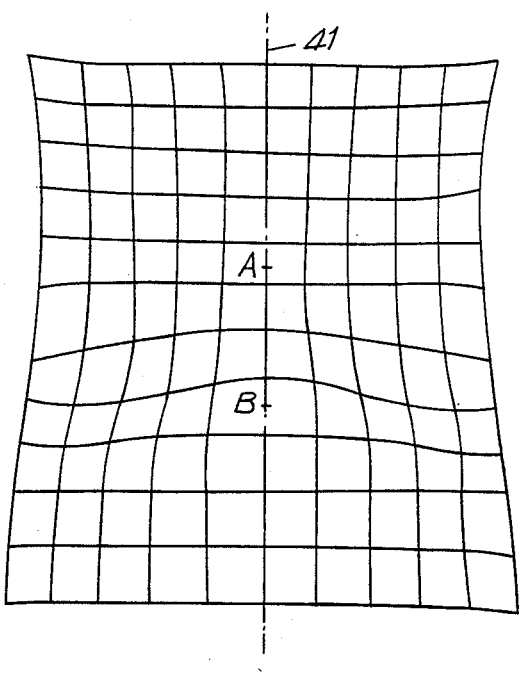
FIG.4

FIG.5
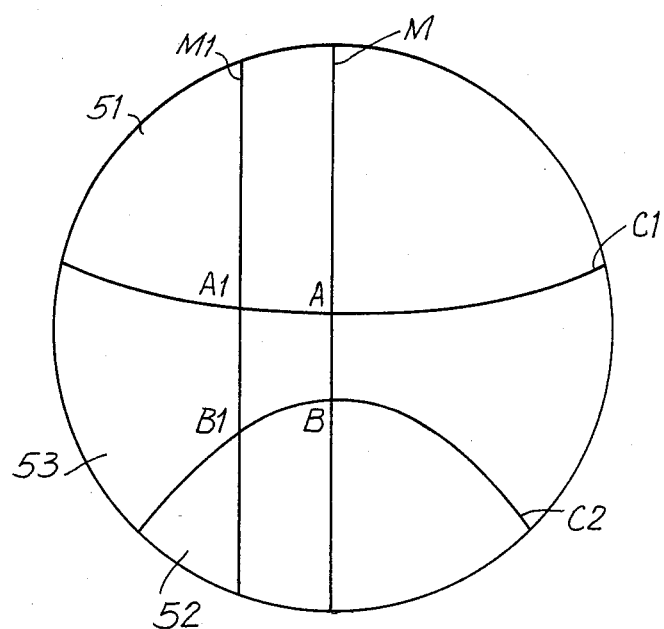
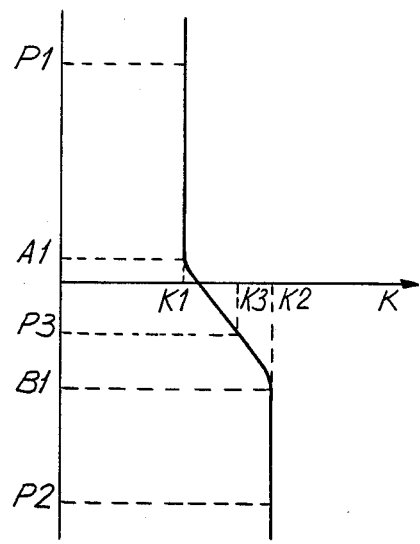
FIG.6

FIG.12
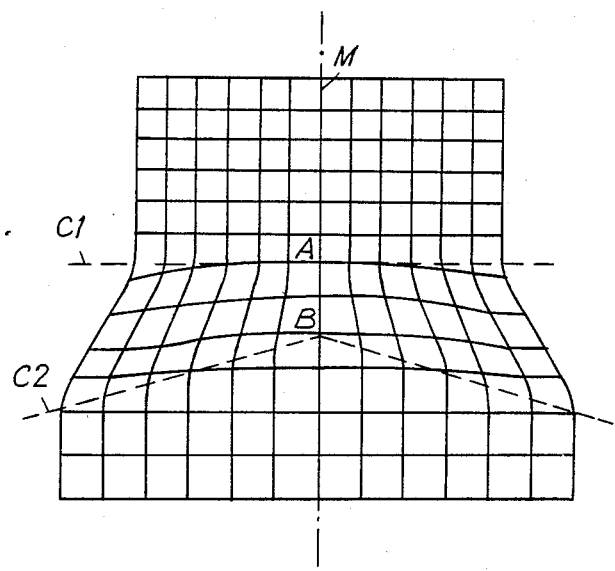
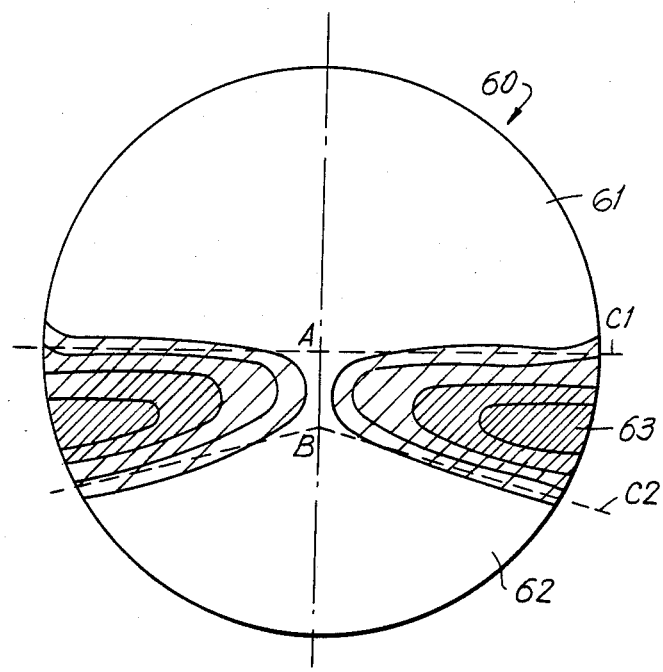
FIG.13

FIG. 14
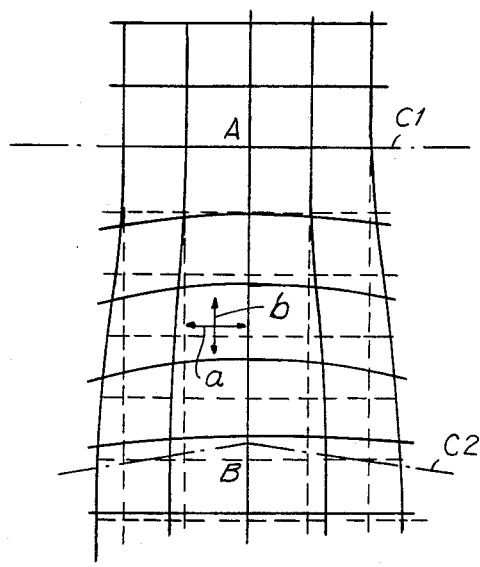
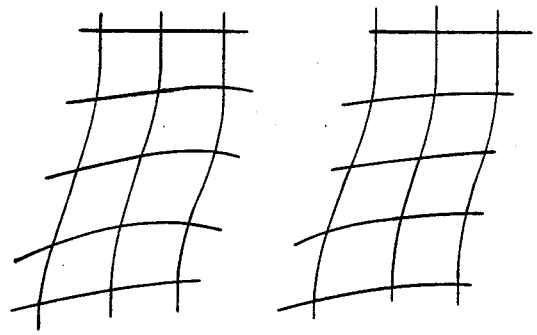
FIG. 15(a)   FIG. 15(b)

PROGRESSIVE MULTIFOCAL OPHTHALMIC LENSES

BACKGROUND OF THE INVENTION

This invention relates to ophthalmic lenses, and more particularly to ophthalmic lenses having progressively varying focal power.

Progressive multifocal lenses are intended to provide a person, particularly one of advanced age whose ability to control his crystalline lenses has weakened, with an ophthalmic lens for compensating for this loss. The progressive multifocal lenses have three zones, namely, a far vision viewing zone, a near vision viewing zone and an intermediate vision viewing zone having progressively varying focal power. The zones are referred to as a far zone, a near zone and an intermediate zone.

Progressive multifocal lenses have an aspherical surface, and as a result, astigmatism and distortion of images are inevitably caused. In order to provide an improved lens it has been sought to distribute astigmatism uniformly throughout the entire surface of the lens in an effort to reduce image distortion and to reduce the shaking of the image when the wearer moves his face. Several issued U.S. patents suggest solutions, such as U.S. Pat. Nos. 3,687,528 and 3,910,691. Additionally, U.S. Pat. Nos. 4,055,379, 4,056,311 and 4,062,629 provide a clear viewing zone in the far zone and in the near zone for a large area and concentrate astigmatism in the peripheral portions of the clear viewing zone.

These proposals have not been entirely satisfactory and further improvements are necessary. Accordingly, it would be desirable to provide a progressive multifocal lens having reduced astigmatism and image distortion. Additionally, it is desirable to provide such benefits by reducing skew distortion in the far zone and in the near zone.

SUMMARY OF THE INVENTION

Generally speaking, in accordance with the invention, ophthalmic lenses having a refractive surface divided into a far vision viewing zone, an intermediate vision viewing zone and a near vision viewing zone are provided. The refractive surface of the lens has a curvature which varies between the optical center of the far vision viewing zone on the principal meridian curve and the optical center of the near vision viewing zone on the principal meridian curve in accordance with a prescribed law. A curve $C_1$ which intersects the principal meridian curve at the optical center of the far vision viewing zone divides the far vision viewing zone from the intermediate vision viewing zone. A second curve $C_2$ intersects the principal meridian curve at the optical center of the near vision viewing zone for defining the boundary between the intermediate vision viewing zone and the near vision viewing zone.

The lenses are characterized by a refractive surface wherein an angle formed by a line normal to the refractive surface from each point along the intersection of an arbitrary plane which is parallel to a plane including the principal meridian curve of the refractive surfce of the lens and a plane including the principal meridian curve is constant in the far vision viewing zone and in the near vision viewing zone. This angle formed by intersection of the normal line and the plane including the principal meridian curve changes in accordance with the same law as that of the curvature of the refractive surface along the principal meridian curve between the optical center of the far vision viewing zone and the optical center of the near vision viewing zone in the intermediate vision viewing zone.

In the far vision viewing zone, the intersection of a plane at right angles to the principal meridian curve and the refractive surface of the lens has a circular shape which has the same curvature as that of the principal meridian curve for at least a minimum distance of 2.5 mm from the principal meridian curve. The remaining portions of the intersection has a non-circular shape having a curvature which increases as it moves away from the principal meridian curve.

In the near vision viewing zone, the intersection of a plane at right angles to the principal meridian curve and the refractive surface of the lens has a circular shape having the same curvature as that of the principal meridian curve for a minimum distance of 1.5 mm away from the principal meridian curve. In the remaining portions of this intersection, the curve has a non-circular shape of a curvature which decreases as it is more distant from the principal meridian curve.

Accordingly, it is an object of the invention to provide improved ophthalmic lenses.

It is another object of the invention to provide improved ophthalmic lenses having progressively varying focal power.

It is a further object of the invention to provide progressively varying focal power ophthalmic lenses having reduced astigmatism.

Yet another object of the invention is to provide improved progressively varying focal power ophthalmic lenses having reduced image distortion.

Yet a further object of the invention is to provide a lens designer with criteria for designating progressively varying focal power ophthalmic lenses overcoming the shortcomings of the prior art with respect to astigmatism and distortion.

Still a further object of the invention is to provide a progressively varying power ophthalmic lens wherein the refractive surface of the lens is designed in accordance with the law of changing of curvature of the principal meridian curve.

Still another object of the invention is to provide a progressively varying focal power phthalmic lens having a spherical surface which extends a width for minimum distances from the principal meridian curve in the far vision viewing zone and in the near vision viewing zone.

Still a further object of the invention is to provide a progressively varying focal power ophthalmic lens having reduced view distortion in the far vision viewing zone and in the near vision viewing zone.

Still other objects and advantages of the invention will in part be obvious and will in part be apparent from the specification.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention reference is had to the following description taken in connection with the accompanying drawings, in which:

FIG. 3 is an elevational view of the lens of FIG. 1 showing the distribution of astigmatism;

FIG. 4 is a view of a square grid viewed through the lens of FIG. 1 illustrating distortion of the image;

FIG. 5 is a front elevational view of the refractive surface of a progressively varying focal power ophthalmic lens constructed and arranged in accordance with the invention;

FIG. 6 is a graphical illustration showing the change of the angle made by a line normal to a sectional curve on the refractive surface and a plane including the principal meridian curve of the lens illustrated in FIG. 5;

FIG. 12 is a view of a square grid when viewed through the lens of FIG. 10 showing image distortion;

FIG. 13 is a front elevational view illustrating the distribution of astigmatism of the image of a square grid viewed through the lens of FIG. 10;

FIG. 14 illustrates a square grid viewed through the lens of FIG. 10 showing the effects on astigmatism;

FIGS. 15(a) and (b) illustrate a square grid viewed through the lens of FIG. 10 showing the effects on astigmatism;

DESCRIPTION OF THE PREFERRED EMBODIMENTS

Figure 1:
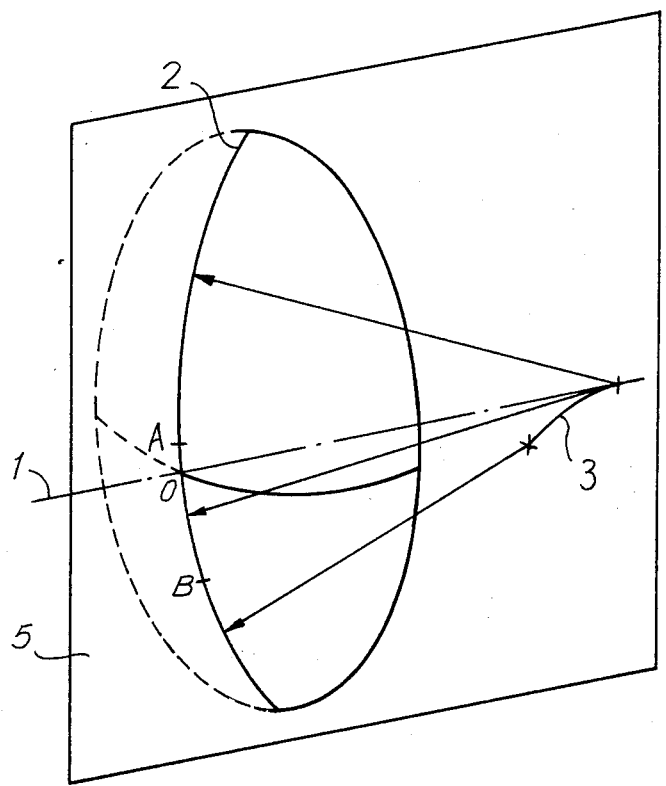
FIG. 1 is a perspective view of the convex surface of an ophthalmic lens having a progressively varying focal power.

The progressively varying focal power ophthalmic lenses prepared in accordance with the invention have three zones, namely, a far vision viewing zone, a near vision viewing zone and an intermediate vision viewing zone having progressively varying focal power. These zones are referred to as the far zone, the near zone and the intermediate zone. FIG. 1 illustrates a perspective view of a convex surface showing the general structure of a progressive multifocal lens. The opposite surface of the lens, not shown in FIG. 1, is concave and for purposes of this invention is assumed to have a spherical shape or a curve columnar surface to compensate for a wearer's far-sightedness, near-sightedness and astigmatism.

The lens in FIG. 1 has a optical center axis 1 (referred to as an optic axis) passing through a point 0 which is the geometric center of the lens. A principal meridian curve 2 is the intersection of vertical plane including optic axis 1 and the refractive surface of the lens.

Figure 2:
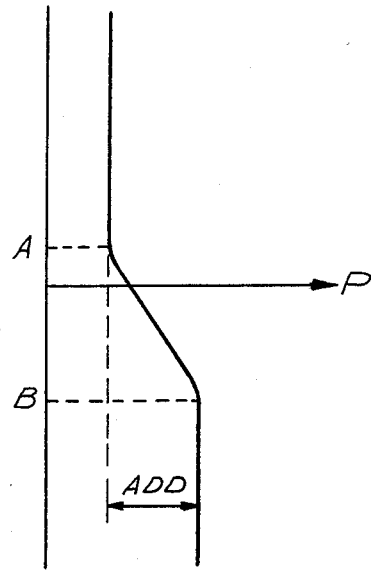
FIG. 2 is a graphical illustration showing the change of focal power along the principal meridian curve for the lens of FIG. 1.

FIG. 2 illustrates the change of curvature of principal meridian curve 2. The ordinate represents the distance along principal meridian curve 2 and the abscissa P represents the focal power at a point on the refractive surface. The focal power along principal meridian curve 2 is constant in the portion of the lens above point A and in the portion of the lens below point B. Between point A and point B, the focal power increases progressively. Point A is the optical center of the far zone and point B is optical center of the near zone and the change in focal power between points A and B is shown as ADD in FIG. 2. This change in focal power is referred to as additional power. As the focal power of the refractive surface of the lens is proportional to its curvature, FIG. 2 also shows the change of curvature. In FIG. 1, a locus of evolute 3 of principal meridian curve 2 is also shown.

At each point on a principal meridian curve, curvature in the direction of the vertical with respect to the principal meridian curve is equal to that along the principal meridian curve. In other words, a principal meridian curve is umbilical and the curvature of the region along the principal meridian curve is substantially spherical. Because of this, astigmatism on a principal meridian curve is 0. But as this region is joined to a spherical surface having a different curvature and a refractive surface changing through a smooth curve as the distance increases from the principal meridian curve, the region adjacent to the principal meridian curve cannot be maintained spherical resulting in astigmatism arising in that region. In addition, as the focal power varies in each region on a refractive surface, distortion of the image increases.

FIG. 3 illustrates distribution of astigmatism of a progressive multifocal lens. In FIG. 3 the narrower the pitch of the hatching, the greater the astigmatism. In other words, the image becomes dimmer in the region of greater astigmatism. Generally speaking, when a lens has a focal power more than 0.5 diopters (hereinafter referred to as "D"), astigmatism can be preceived and yields an uncomfortable view for a wearer of the lens. In the elevational view of FIG. 3 the non-hatched portion is where astigmatism is 0.5D, or less. The portion of the lens above point A is the clear viewing zone of the far zone, the portion of the lens below point B is the clear viewing zone of the near zone and the portion between the two points A and B is the clear viewing zone of the intermediate zone.

FIG. 4 illustrates distortion of the image of a square grid when viewed through the lens of FIG. 3. The square grid has an equal pitch in the direction of the vertical and horizontal. The image of the square grid is distorted as shown in FIG. 4 by its magnification. Namely, vertical lines are symmetrically expanded downwardly with respect to the line on a principal meridian curve 41 and also the horizontal lines are distorted as the lines become more distant in the peripherial portion. When a user looks at an object through the lens which moves relative to the visual point, the user follows the object with his eyes. This image appears to shake and the shaking image is discomforting to the user.

As mentioned above, watching an object which is moving is designated dynamic vision and watching of a single point carefully, such as during reading, is designated static vision. The static vision is influenced largely by astigmatism. That is to say, comfortable vision is available under conditions that each clear viewing zone of the far zone, the near zone and the intermediate zone is large and astigmatism is small within the entire viewing zone. On the other hand, dynamic vision is influenced largely by distortion of the image. Specifically, comfortable vision is available under the condition that the distortion of the image is small.

The relationship between the above noted static vision and dynamic vision is not independent of each other. They have the following inverse relationship. That is, the large clear viewing zone of the far zone and the rear zone which are comfortable for static vision increase the change of magnification in the side portion of the intermediate zone and thereby influence dynamic vision whereby the image is distorted. On the other hand, when dynamic vision is comfortable, astigmatism in the side portion of the far zone and the near zone increases. Thereby, static vision is adversely influenced that the clear viewing zone of the far zone and the near zone is narrowed.

Progressively varying focal power ophthalmic lenses constructed and arranged in accordance with the invention improve these above-mentioned faults wherein progressive multifocal lenses must have astigmatism and distortion of the image in an effort to satisfy both static vision and dynamic vision requirements. Furthermore, the invention provides a design criteria for balancing the needs of static vision and dynamic vision which can be changed to some degree. The following is a detailed description of the embodiments in accordance with the invention.

Figure 7:
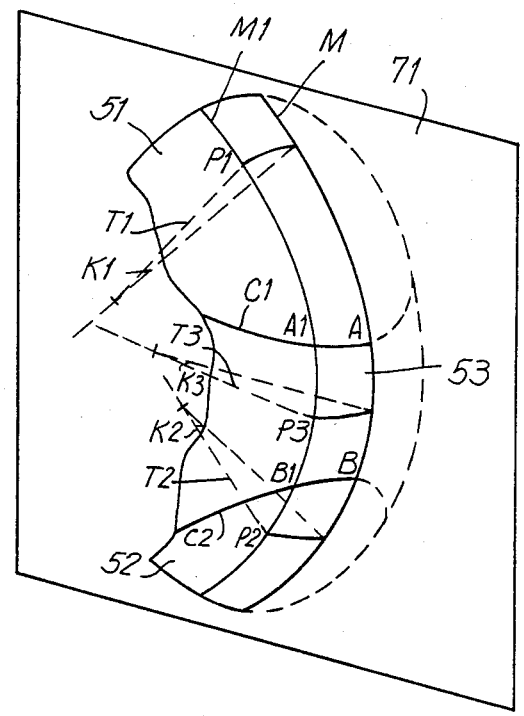
FIG. 7 is a partial perspective view of the refractive surface of the lens illustrated in FIG. 5.

FIGS. 5, 6 and 7 are views illustrating the structure of a refractive surface 50 of a progressive multifocal lens constructed and arranged in accordance with the invention. FIG. 5 is a front view and FIG. 7 is a perspective view of one portion of refractive surface 50. In FIG. 5, $C_1$ is a curve along the surface of refractive surface 50 intersecting with the principal meridian curve M at a point A at the optical center of an upper far vision viewing zone 51. $C_2$ is a curve along the surface of refractive surface 50 intersecting with principal meridian curve M at a point B at the optical center of a lower near vision viewing zone 52. Curves $C_1$ and $C_2$ divide refractive surface 50 of the lens into three portions; namely, far zone 51, near zone 52 and an intermediate zone 53 therebetween. A curve $M_1$ is formed by the intersection along refractive surface 50 of an arbitrary plane drawn parallel to a plane including the principal meridian curve.

The intersection of curve $M_1$ and $C_1$ is $A_1$ and the intersection of curves $M_1$ and $C_2$ is $B_1$. A normal line drawn from refractive surface 50 of the lens at any point along intersection $M_1$ and the plane including principal meridian curve M forms an Angle K. Angle K changes when the normal line is drawn from various points of intersection $M_1$ as shown in FIG. 6.

The perspective view in FIG. 7 provides a detailed explanation for understanding the change of Angle K. In FIG. 7, $P_1$, $P_2$ and $P_3$ are points on intersection $M_1$ in the respective zones, that is far zone 51, near zone 52 and intermediate zone 53. The normal lines drawn from each of these points $P_1$, $P_2$ and $P_3$ are shown by symbols $T_1$, $T_2$ and $T_3$. Normal lines $T_1$, $T_2$ and $T_3$ and a plane 71 which include principal meridian curve M form Angles $K_1$, $K_2$ and $K_3$, respectively.

Figure 8:
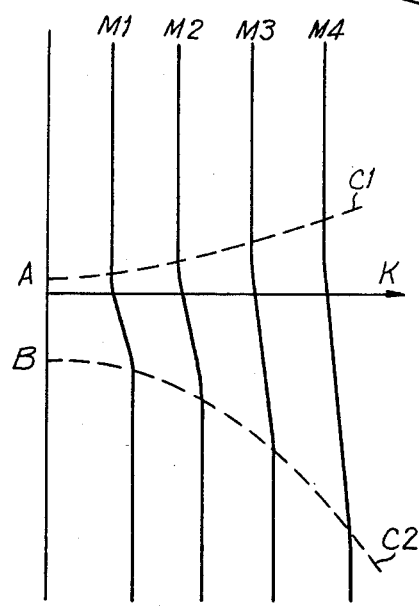
FIG. 8 is a graphical representation showing the distribution of the angle made by a plane including the principal meridian curve and a normal line to several sectional curves on the refractive surface of the lens of FIG. 5.

One of the characteristics of the lenses prepared in accordance with the invention is as shown in FIG. 6 wherein the ordinate represents a position on intersection $M_1$ and the abscissa shows the Angle between normal line T and plane 71. In FIG. 6, each value of Angle K is constant in far zone 51 (the portion above point $A_1$) and near zone 52 (the portion below point $B_1$). On the other hand, the value of Angle K in intermediate zone 53 is continually changing. The law of this change is the same as that of the curvature along a principal meridian curve. This law is satisfied in all the intersections of planes parallel to a plane including a principal meridian curve. FIG. 8 illustrates the change of Angles mentioned above for a plurality of intersecting parallel planes as the planes become more distant from a principal meridian curve in the order of $M_1$, $M_2$, $M_3$ and $M_4$.

Figure 9A:
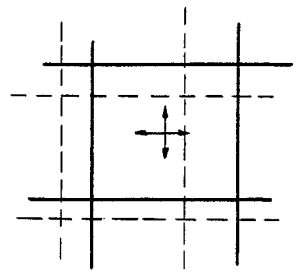
FIG. 9(a) illustrates normal distortion and FIG. 9(b) illustrates skew distortion when an image is viewed through a progressively varying focal power lens.
Figure 9B:
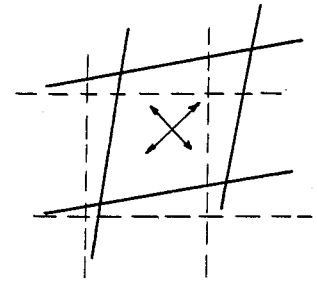

Before describing the effects of the invention mentioned above, the relationship among astigmatism, distortion of the image and the prismatic effect should be understood. FIG. 9 is an image of a portion of a square grid viewed through the lens of FIG. 5. In FIG. 9(a) and FIG. 9(b), the broken line represents the image without a lens and the solid line shows the image when viewed through the lens. FIG. 9(a) represents normal distortion, that is to say the shape of the square grid changes to the shape of a rectangle having sides parallel to the lines of the grid. In this case of normal distortion, the amount of the prismatic effect on the vertical and horizontal lines, which is in a direction orthoginal with respect to each vertical line or with respect to each horizontal line of the square grid, is constant. Thus, the astigmatism appears as the difference between the long side and short side of the rectangle. The direction of the maximum curvature and the minimum curvature are, as shown by the arrowheads in both directions in FIG. 9(a), are in the direction parallel with respect to each line of the square grid.

FIG. 9(b) represents skew distortion, that is the square grid changes to the shape of a parallelogram, or the like. In this representation of skew distortion, the amount of the prismatic effect on the vertical and the horizontal lines is in directions orthoginal with respect to each vertical line or with respect to each horizontal line of the square grid is not constant. Accordingly, astigmatism appears as the degree of change of shape of the square grid to the parallelogram. The direction of the maximum curvature and the minimum curvature are shown by the arrowheads in both directions in FIG. 9(b) which are not parallel to the square grid pattern.

The following is a description of the effect on a wearer's vision due to both types of distortion noted above. With respect to static vision, normal distortion makes the image stretch or shrink in the direction of the horizontal or of the vertical. Further, when astigmatism exceeds the allowed value (0.5D), the image is not in focus. On the other hand, skew distortion makes the image stretch or shrink in a slanted direction, and in the same manner as with respect to normal distortion, the image is not in focus. With respect to dynamic vision, normal distortion gives the image an appearance of change of speed and skew distortion makes the image appear to shake.

The following are descriptions of embodiments illustrating the visual effects in accordance with the invention. In the following embodiments, the focal power of the lens in the far zone is 0. Even when the far zone is altered for myopia, hyperopia, or astigmatism, there is no change in the effects obtained in accordance with the invention.

Figure 10:
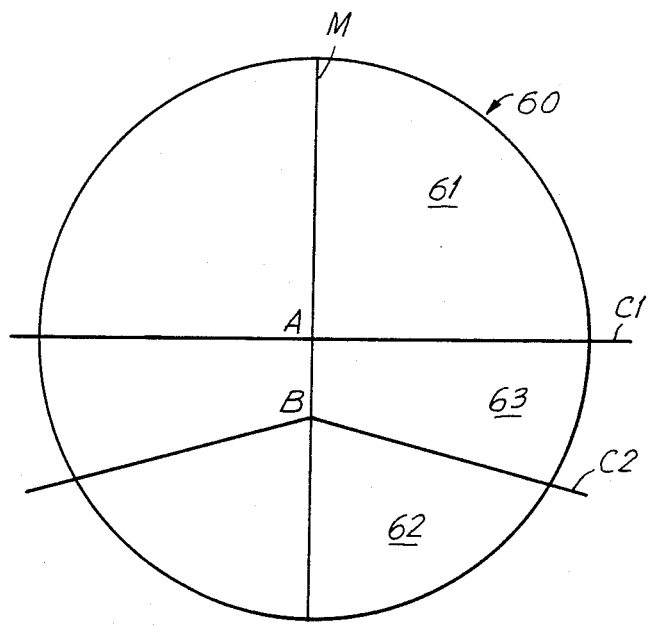
FIG. 10 is a front elevational view of the refractive surface of a progressively varying focal power ophthalmic lens constructed and arranged in accordance with a first embodiment of the invention.
Figure 11:
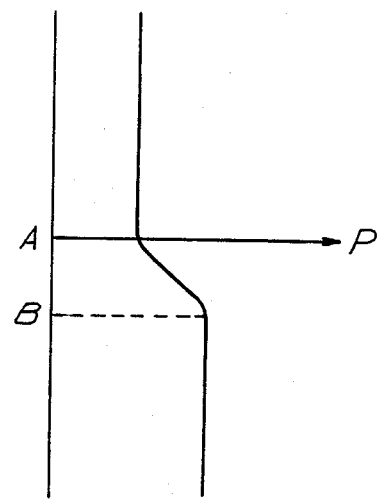
FIG. 11 is a graphical illustration showing the distribution of focal power of the lens of FIG. 10 along the principal meridian curve.

FIG. 10 illustrates the first embodiment showing a lens 60 in accordance with the invention. In this embodiment, a first boundary line $C_1$ is between a far zone 61 and an intermediate zone 63 is a horizontal line passing through a geometric center A of the lens. A second boundary line $C_2$ between intermediate zone 63 and a near zone 62 is a straight line having peripheral portions which drop symmetrically with respect to principal meridian curve M as it moves away therefrom. Additionally, far zone 61 and near zone 62 are spherical and their additive power is 2D (hereinafter all additional power is additional power of 2D). It is clear that the spherical surface satisfies the condition in accordance with the invention in the far zone and in the near zone. FIG. 11 shows the change of curvature of principal meridian curve M in accordance with this embodiment.

The change in curvature between optical center A of far zone 61 and optical center B of near zone 62 is constant except for the portion adjacent to optical center A of far zone 61 and optical center B of near zone 62. In the regions adjacent to each optical center of far zone 61 and near zone 62, the curvature changes as a smooth curve as shown in FIG. 11. FIG. 12 illustrates the distortion of the image of a square grid when viewed through a lens prepared in accordance with this embodiment of the invention.

As far zone 61 and near zone 62 have spherical surfaces, as in the case of a typical single vision lens, very little skew distortion appears on the surface. But the problem of skew distortion is so insignificant that it can be neglected visually. The image of a square grid is magnified by the magnifying power in each zone and becomes a magnified square grid. In intermediate zone 63, as shown in FIG. 8, an Angle K (which is made by a plane including a principal meridian curve and a normal line from a point on the intersection of a plane which is parallel with the plane and the refractive surface) changes in the same way as shown in FIG. 11 extending from the boundary of far zone 61 to the boundary of near zone 62. This change in the Angle is proportional approximately to the change of amount of prismatic effect in a horizontal direction. Therefore, the vertical line of a square grid between the boundary of far zone 61 and the boundary of near zone 63 is expanded towards the peripherial portion in the same way as the change of the Angle; that is to say, the rate of change of curvature along a principal meridian curve.

In this embodiment of the invention, the change of curvature along a principal meridian curve is as shown in FIG. 11 so that vertical lines of a square grid in intermediate zone 63 are expanded in straight lines outwardly from the region adjacent to the boundary of far zone 61 to that of near zone 62. In the portion of the surface adjacent to each boundary, the curvature changes smoothly. Horizontal line of the square grid are gradually distorted downwardly as the lines are drawn from principal meridian curve M towards the periphery of the lens.

FIG. 13 is an elevational view showing the distribution of astigmatism in lens 60 prepared in accordance with this embodiment of the invention. The region of distinct vision, that is the clear vision viewing zone, is shown as a non-hatched region. In this region, astigmatism is 0.5D, or less and includes, the entire far zone 61 and near zone 62 and also the region adjacent to principal meridian curve extending from the optical center A of far zone 61 to the optical center B of near zone 62. The effects of astigmatism in this embodiment of the invention are found in the region of the lens adjacent to the principal meridian curve M and the entire of intermediate zone 63.

In the region of lens 60 adjacent to principal meridian curve M, the change of the Angle K made by a normal line from each point along the intersection and the plane parallel to a plane including a principal meridian curve, or the prismatic change in the horizontal direction is made equal to the change of curvature on a principal meridian curve, in other words the change of magnification of the image in a vertical direction and thereby astigmatism can be kept small. This is illustrated in FIG. 14.

Referring to FIG. 14, it is clear that astigmatism is kept small by making magnification "b" of the image magnified vertically along principal meridian curve M and magnification "a" the magnification along the horizontal change of the prismatic effect equal. In the whole of intermediate zone 63, distortion of the square grid in the pattern in the direction of the vertical is made equal to the other squares and the distorted image of the square grid changes gradually. As a result, large partial astigmatism does not appear and small astigmatism is distributed throughout intermediate zone 63. It is evident from FIG. 15 that the image of a square grid shown in FIG. 15(b) in accordance with this embodiment of the invention has less astigmatism than an image shown in FIG. 15(a) which is seen through a lens not prepared in accordance with the invention. As described above, a lens prepared in accordance with this embodiment of the invention makes it possible to avoid the sudden change in distribution of astigmatism and further reduces the astigmatism to a lower level.

Figure 16:
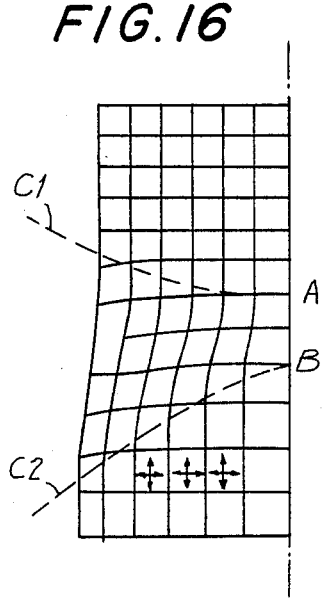
FIG. 16 is a view of a square grid viewed through a lens in accordance with a second embodiment of the invention showing distortion of the image.
Figure 17:
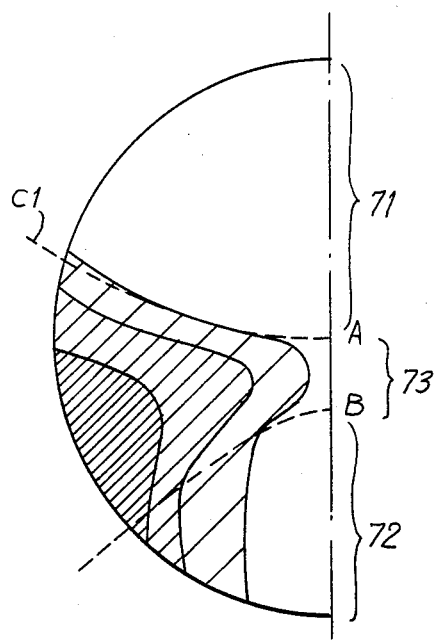
FIG. 17 is partial front elevational view of the lens in FIG. 16 showing distribution of astigmatism according to this embodiment of the invention.

FIGS. 16 and 17 show distortion of the image of square grid and the distribution of astigmatism in accordance with a second embodiment of the invention. In each of the embodiments in accordance with the invention the lenses are symmetrical with respect to the principal meridian curve M. Therefore, the right half of the lens has been eliminated from the figures for purposes of discussion. Additionally, each element illustrated in the first embodiment of the invention is equally applicable to the same element in the latter embodiments. In this second embodiment, the refractive surface in far zone 61 has a spherical surface and near zone 63 has an aspherical surface. Further, far zone 61 is the same as in the first embodiment, namely the image of a square grid does not change when viewed through this zone. However, near zone 62 has a aspherical surface so that a square grid changes as it is viewed in the peripherial portions.

In accordance with this embodiment of the invention, an Angle made by a plane including a principal meridian curve and a normal line from the intersection of an arbitrary plane parallel to the former plane and the refractive surface is constant along the intersection in near zone. Further, as the above-mentioned matter holds for all intersections of planes parallel to a plane including the principal meridian curve, the direction of maximum and minimum curvature is equal to the direction parallel or at right angle to the intersection. Therefore, as shown by the arrowheads in the horizontal and vertical direction in FIG. 16, the direction of the maximum and minimum curvature is equal in the direction in parallel to the sides of a square grid and near zone 62 has normal distortion. Of course, skew distortion, which is caused by spherical or columnar surfaces formed on the opposite surface to the refractive surface of the lens, can be ignored usually as in the case of a single vision lens. FIG. 17 shows distribution of astigmatism in a lens prepared in accordance with this embodiment of the invention.

As the surface of far zone 61 is spherical, there is no astigmatism to be found and a large clear viewing zone is obtained. In near zone 62, the refractive surface has normal distortion which becomes larger as the position on the lens is more distant from the main principal meridian. As a result of this, as shown in FIG. 17, when points on the surface which have the same astigmatism are joined, it appears along the vertical lines. In this embodiment, as the refractive surface of the near zone is aspherical, distortion of the image is small. This matter is shown clearly by comparing FIG. 16 and FIG. 12. Near zone 72 in FIG. 16 shows normal distortion and an image does not appear to shake. On the other hand, astigmatism is reduced in intermediate zone 73 when it increases in near zone 72.

Figure 18:
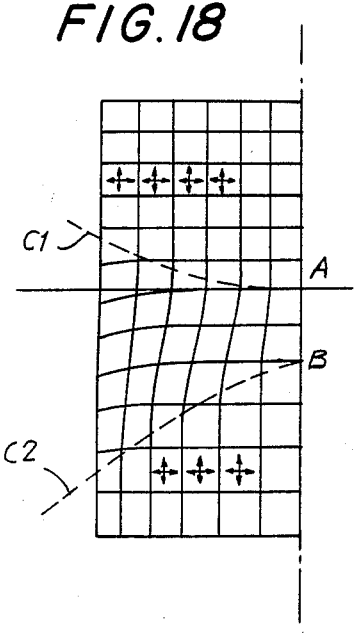
FIG. 18 is a view of a square grid viewed through a lens in accordance with a third embodiment of the invention showing distortion of the image.
Figure 19:
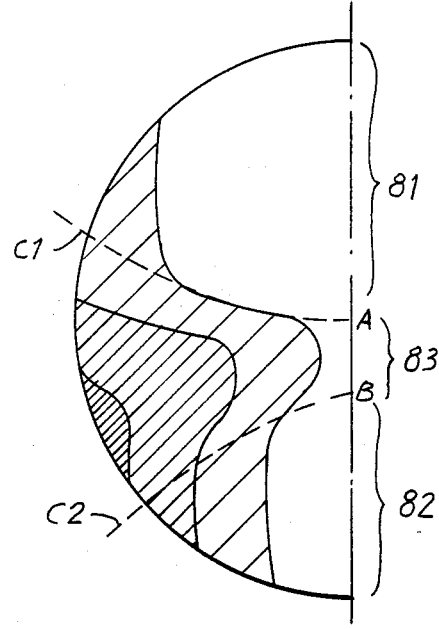
FIG. 19 is a partial front elevational view of the lens viewed in FIG. 18 showing distribution of astigmatism according to this embodiment of the invention.

FIGS. 18 and 19 illustrate a third embodiment in accordance with the invention. In this third embodiment, far zone 81 and near zone 82 each have an aspherical surface. Thus, each has normal distortion as described with respect to near zone 72 of the second embodiment. In this third embodiment, distortion of the image is smaller than that in the second embodiment and further, as far zone 81 and near zone 82 each have normal distortion, the image does not appear to shake. Astigmatism in this embodiment is as shown in FIG. 19, that is it is reduced in intermediate zone 82 with some present in far zone 81. When points which have the same astigmatism are joined, they appear as vertical lines in far zone and near zone.

Figure 20:
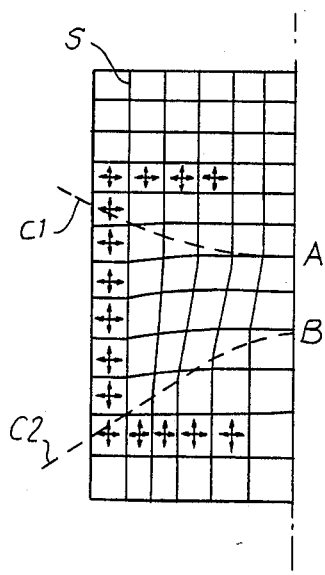
FIG. 20 is a view of a square grid viewed through a lens in accordance with a fourth embodiment of the invention.
Figure 21:
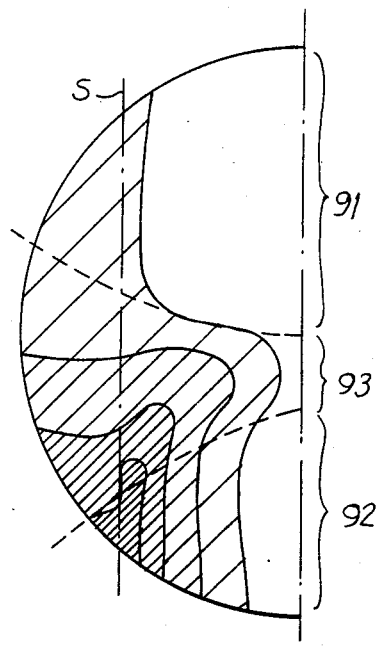
FIG. 21 is partial front elevational view of the lens viewed in FIG. 20 showing distribution of astigmatism according to this embodiment of the invention.

FIGS. 20 and 21 show a fourth embodiment in accordance with the invention. In this fourth embodiment, the refractive surfaces of far zone 91 and near zone 92 are each aspherical. On an intersection of an arbitrary plane and the refractive surface, the plane being parallel to a plane including the principal meridian curve is equivalent to a vertical line "S". The Angle made by a normal line from the refractive surface and this arbitrary plane is constant. Additionally, in the region outside of intersection S the Angle is constant throughout the entire portion. This region outside vertical line S has normal distortion and the distortion of the image is smaller than that in the third embodiment. In this embodiment, astigmatism becomes larger in the portion inside intersection S and the clear viewing zone becomes smaller than that of the third embodiment illustrated in FIGS. 18 and 19.

Figure 22:
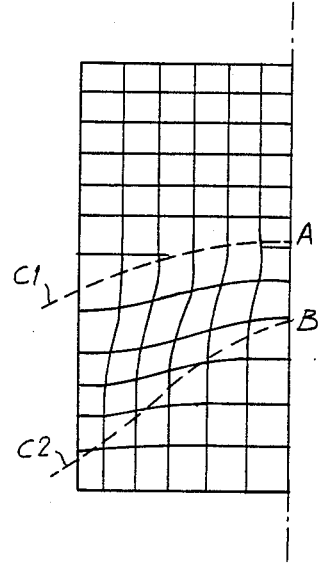
FIG. 22 is a view of a square grid viewed through a lens in accordance with a fifth embodiment of the invention.
Figure 23:
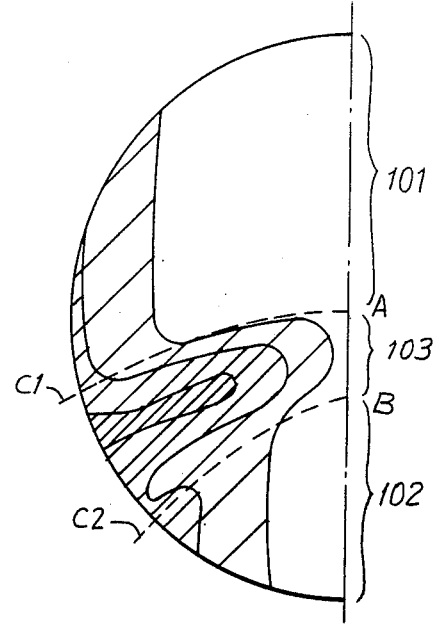
FIG. 23 is a partial front elevational view of the lens viewed in FIG. 22 showing distribution of astigmatism according to this embodiment of the invention.

FIGS. 22 and 23 illustrate a fifth embodiment in accordance with the invention. In this fifth embodiment, as shown in FIG. 22, intermediate zone 103 is distorted downwardly for position moving away from the principal meridian curve and the rate of change of the Angle represents a sine curve. Far zone 101 and near zone 102 each have an aspherical surface. In this fifth embodiment, far zone 101 is enlarged and by making the rate of change of the Angle a sine curve, astigmatism is concentrated in the region between curves $C_1$ and $C_2$. Therefore, a clear viewing zone in far zone 101 and near zone 102 is enlarged.

According to this fifth embodiment, far zone 101 and near zone 102 both have normal distortion. As a result of this, it is possible to avoid shaking of the image in dynamic vision. On the other hand, in intermediate zone 103, by arranging distortion of the image, it is possible to reduce the skew distortion and thus obtain a smooth distortion curve. The balance between the lens characteristics of static vision and that of dynamic vision can freely be changed by selecting and combining elements for each of the three zones, namely the far zone, the near zone and the intermediate zone; the law of the rate of change of curvature along the principal meridian curve; or formation of a spherical surface or an aspherical surface in the far zone and the near zone.

Finally, the following points are noted. This invention has been described for some embodiments wherein the lens has a symmetrical refractive surface with respect to the principal meridian curve. However, this invention is not intended to be restricted only to these embodiments. It is clear from this description that lenses prepared in accordance with this invention will fall thereunder even if the three zones of the lens, namely the far zone, the near zone and the intermediate zone are not divided symmetrically. The invention also encompasses formation of spherical or aspherical surfaces in the far zone and the near zone which are not symmetrical. In addition to the above, it is also within the scope of the invention that the side portions of the intermediate zone, the rate of change of the Angle made by a plane including the principal meridian curve and a normal line from the intersection along the refractive surface with a plane parallel to the former plane may deviate somewhat from the law of the rate of change of curvature of the principal meridian curve.

Referring again to FIG. 8, the change of the Angle along the intersection is in proportion to the change in prismatic effect in the horizontal direction. Accordingly, FIG. 8 can be regarded as showing the distortion of a vertical line at each intersection. The distortion of a horizontal line and vertical line are related to each other. In other words, if there is little or no distortion on a horizontal line, a vertical line will also show little or no distortion. Similarly, if a horizontal is distorted, a corresponding vertical line is also distorted. In view of this, the image of a square grid viewed through far zone 51 and near zone 52 have normal distortion which means that the square grid changes to a rectangular form and intermediate zone 53 skew distortion changes the square grid to the shape of a parallelogram. As a result of this shaking of the image in far zone 51 and near zone 52 can be reduced.

In intermediate zone 53 a vertical line is distorted according to the same law of change as the curvature between optical center A of far zone 51 and optical center B of near zone 52 along principal meridian curve M. As astigmatism on principal meridian curve M is 0, the square grid viewed through the peripheral regions is adjusted and thereby astigmatism and distortion of the image can be reduced to the maximum extent. The further embodiments of the invention provide progressively varying focal power lenses in accordance with this discussion.

Progressive multifocal lenses have characteristics not possessed by a single vision lens and a bifocal lens. For example, with respect to manufacture of the lens, the entire surface of the lens does not consist of one or more spherical surfaces, as the progressive multifocal lens has a surface which is aspherical. As a result of this, it is difficult to measure accurately the shape by optical or mechanical means and also to control accuracy of the measurement of the shape. Further, when using progressive multifocal lenses in eye glasses the width of the intermediate clear viewing zone is narrow requiring that, the lenses be fit and positioned for a left and a right lens taking into consideration convergence of the eyeballs.

Figure 24:
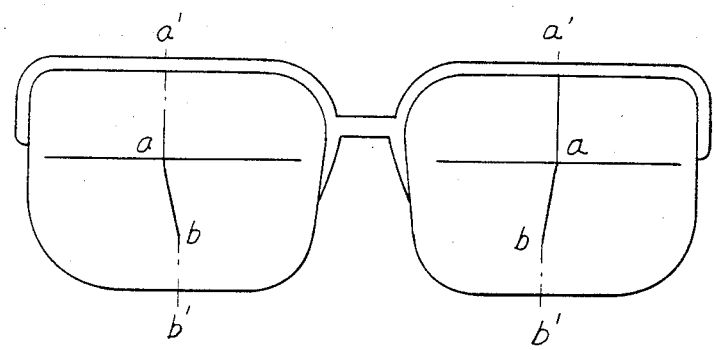
FIG. 24 is a front elevational view showing the movement of a eyeball along a line of vision on a pair of eyeglasses.

FIG. 24 shows the displacement of the line of vision on the lenses of a pair of eyeglasses when viewing an object at intermediate distance using the intermediate clear viewing zone. When the line of vision moves gradually from a far horizontal distance to a position near at hand, an eyeball view through a point on the lens gradually moving from point "a" to point "b" as shown in FIG. 24 as the eyeballs converge. The locus of this line of vision has an angle of about 10° with respect to the vertical. On the other hand, when looking at an object using the far zone and the near zone, especially when gazing steadily at them as ones face is moved in front of the object, the adjacent positions of the line of vision a-a' or the line vision b-b' on the lens are used.

In view of this, it is desirable not to have astigmatism in a portion of the lens adjacent to the line a-a' and the line b-b'. This line a'-a-b-b' is generally referred to as a visual center line. In conventional progressive multifocal lenses, an umbilical curve is formed along the visual center line. The surfaces of the far and near zones are made to be spherical and a lens which is geometrically symmetric is produced. Additionally, the principal meridian curve along the axis of symmetry is inclined about 10 degrees along the line a-b. When an umbilical curve is formed along the visual center line, the lenses are not symmetric geometrically, and it is necessary that the lenses be made exclusively for the right or the left eye. This is extremely inconvenient to control during the manufacturing process, that is from the time of manufacture of the lens to the finishing of a pair of glasses. On the other hand, when the surfaces of the far zone and the near zone are spherical, the width of the intermediate clear viewing zone becomes very narrow and the lens must be accurately fitted for the user's eye. Progressive multifocal lenses prepared in accordance with the invention overcome these defects and offer a lens which is easy for users to use, easier to manufacture and easier for an optician to fit into eyeglasses. These further embodiments of the invention will be described in detail with respect to FIGS. 25-29.

Figure 25:
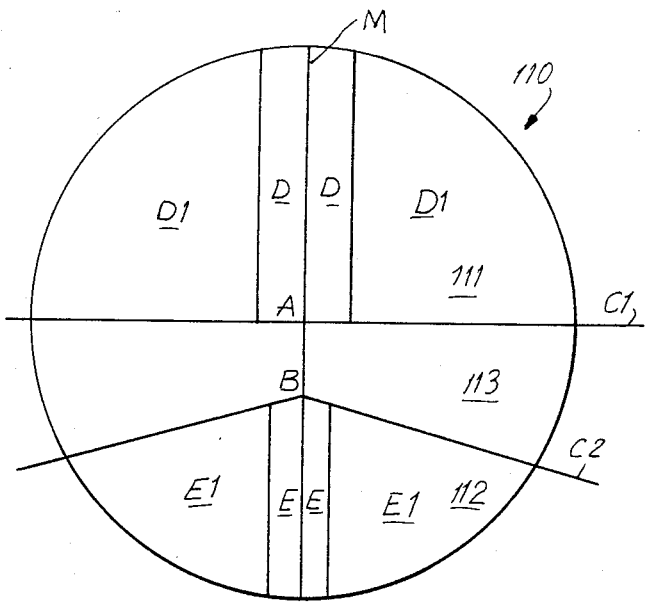
FIG. 25 is a front elevational view of the refractive surface of a progressively varying focal power ophthalmic lens constructed and arranged in accordance with a further embodiment of the invention.

FIG. 25 is a front view of a progressive multifocal lens 110 in accordance with this further embodiment of the invention. In this embodiment the optical center A of a far zone 111 is on a geometric center of lens 110 and a first boundary line $C_1$ between far zone 110 and an intermediate zone 113 is horizontal. A second boundary line $C_2$ between near zone 112 and intermediate 113 is a straight line which drops symmetrically from the optical center as it moves towards the peripheral portion of near zone 112 away from a principal meridian curve M. Characteristics of lens 110 in accordance with this embodiment of the invention is that in far zone 111 and in near zone 112, as is shown, each zone includes a spaced spherical zone D and E and an aspherical zone $D_1$ and $E_1$. Specifically, in far zone 111, the width of each spherical zone D is at least 2.5 mm from principal meridian curve M. In outer zone $D_1$ the curvature which is in a horizontal direction increases as it becomes more distant from principal meridian curve M. On the other hand, in near zone 112, the width of each spherical zone E is at least 1.5 mm from principal meridian curve M. In outer zone $E_1$, the curvature in the horizontal direction decreases as it becomes more distant from principal meridian curve M. In other words, a line along the refractive surface intersecting principal meridian curve M at right angles is circular for a distance of at least 2.5 mm on each side of principal meridian curve M in far zone 111 and at least 1.5 mm from the principal meridian curve in near zone 112. The radius of curvature of the circular form is equal to that of principal meridian curve M at the point of intersection with principal meridian curve M.

In the region outside of the circular form, in far zone 111, the radius of curvature decreases as it moves more distant from principal meridian curve M and is then non-circular in shape. In near zone 112, the radius of curvature increases as it moves more distant from principal meridian curve M and then becomes non-circular in shape.

Figure 26:
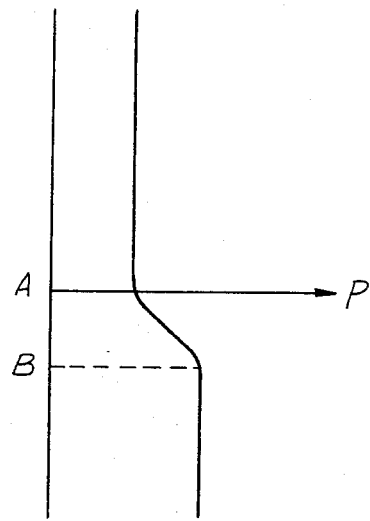
FIG. 26 is a graphical illustration showing the change in focal power along the principal meridian curve for the lens of FIG. 25.
Figure 27:
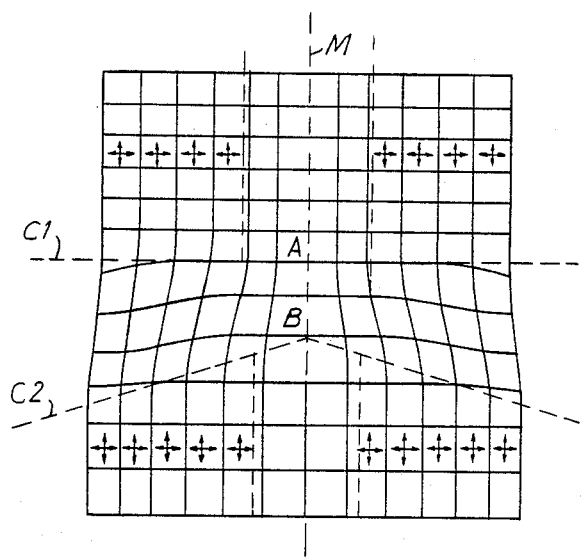
FIG. 27 is a view of a square grid viewed through the lens of FIG. 25 showing distortion of the image.

FIG. 26 shows the change of focal power of the refractive surface of the lens, that is to say the change of curvature. FIG. 27 shows distortion of the image of a square grid when viewed through the lens 110 of FIG. 25. The broken lines in FIG. 27 represent the various zones identified in connection with the description of FIG. 25. In the portion of the lens corresponding to the spherical surface of far zone 111 and near zone 112, the square grid is magnified with the magnification power corresponding to the focal power of each portion. In the peripheral regions of each of said portions, there is normal distortion of which the maximum or minimum curvature is in the horizontal and vertical direction of the arrowheads as shown in connection with this embodiment.

In the side portion of far zone 111, the images are distorted as a point becomes more distant from principal meridian curve M and the image appears stretched horizontally. In a corresponding portion in near zone 112, the image is distorted as it becomes more distant from principal meridian curve M with the image being compressed horizontally. Thereby, distortion of the image in the side regions of the lens is reduced.

Figure 28:
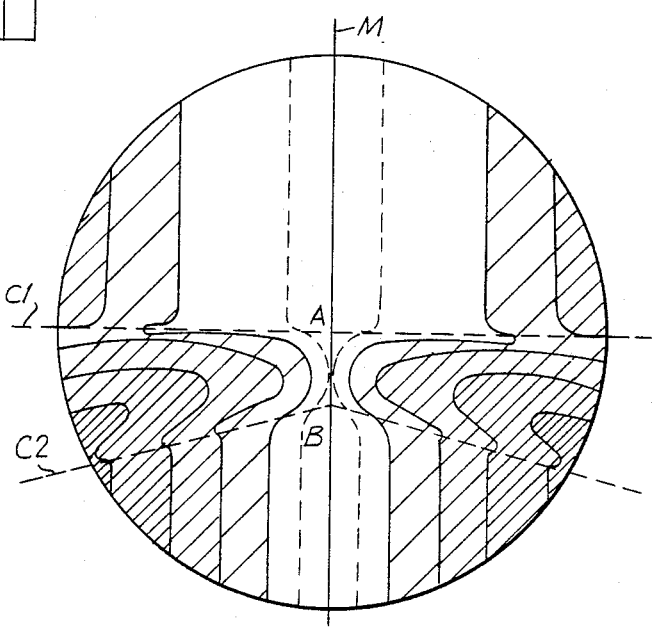
FIG. 28 is a front elevational view of the lens of FIG. 25 illustrating the distribution of astigmatism.

FIG. 28 shows the distribution of astigmatism of lens 110 in accordance with FIG. 25. In this embodiment, the portion of the lens surrounded by the broken lines in the non-hatched portion, that is in the clear viewing zone, includes the shperhical protions of far zone 111 and near zone 112 and the portion adjacent to principal meridian curve M in intermediate zone 113 which have no astigmatism. In other words, astigmatism in this region is 0. In far zone 111 and near zone 112, astigmatism increases in proportion to the law of increase or decrease of curvature in side portions $D_1$ and $E_1$.

Figure 29:
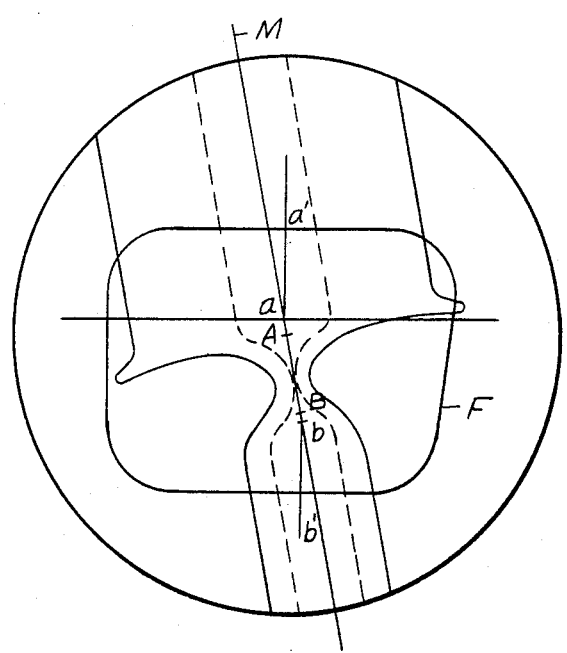
FIG. 29 is an elevational view of the refractive surface of a lens in accordance with the invention showing the effect of glazing further in accordance with the invention.

The following is a description of the visual effect when utilizing a progressive multifocal lens prepared in accordance with this embodiment of the invention. FIG. 29 shows the cut shape of the lens for utilization in eyeglasses in accordance with this embodiment. A lens prepared in accordance with this embodiment is cut into a shape F which is inclined about 10 degrees with respect to horizontal visual line "a" at a point 2 or 3 mm above the optical center of far zone A on the principal meridian curve. As shown in FIG. 29, the clear viewing zone and the spherical zone are described as shown in FIG. 28 with the right side corresponding to the side adjacent to the nose of wearer. It is evident from this embodiment that by inclining the lens about 10 degrees, the principal meridian curve M overlaps with a visual center line a-b discussed above, and thereby, the user is provided with comfortable intermediate vision. The effects obtained in accordance with this embodiment of the invention are notable along the visual center line in the far zone and the near zone. Specifically, the visual center line a'-a-A in the far zone is substantially included in the spherical zone having a width of at least 2.5 mm on each side from the principal meridian curve. Additionally, the visual center line B-b-b' in the near zone is substantially included in the spherical zone of the lens having a width of at least 1.5 mm on each side of the principal meridian curve. Thus, astigmatism along the visual center line in both zones is 0.

Usually glasses are formed having about 12 to 15 mm distance between "a'" and "a", about 10 mm distance between "b" and "b'" with an angle of inclination of about 10 degrees. It goes without saying that astigmatism along the visual center line which is frequently in use for a steady gaze is 0 which reduces fatigue of the eyes after usage for long time. Furthermore, in accordance with this invention, it is not necessary to provide a non-symmetrical lens to avoid astigmatism on the visual center line. The right lens may be inverted and thus only one lens may be utilized for both the left and the right eye. In view of this, substantial savings during production of glasses and production control are obtained.

In the side portions of the far zone and the near zone, the curvature along the line intersecting the principal meridian curve at right angles changes as noted above which results in reduced distortion of the image in the peripheral portion. The width of the intermediate clear viewing zone is broadened and the accuracy for setting positions of a visual center line a-b and the principal meridian curve are relaxed. On the other hand, during manufacture of the lenses, in that the far zone and the near zone have spherical surfaces, it is much easier to provide accurately formed refractive surfaces. Additionally, it is easier to measure by optical or mechanical methods.

As described above, the progressive multifocal lenses prepared in accordance with this invention provide a user with fine static vision and dynamic vision. Additionally, such lenses provide an optician with a lens which may be utilized for improved ease of fitting of glasses. Further, the invention provides a lens manufacturer with ease of manufacturing and control of the lenses. These effects are not lost even if a spherical curve is in either the far zone or in the near zone.

It will thus be seen that the objects set forth above, among those made apparent from the preceding description, are efficiently attained and, since certain changes may be made in the above articles without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A progressively varying focal power ophthalmic lens comprising:
   a refractive surface divided into a far vision viewing zone, an intermediate vision viewing zone and a near vision viewing zone,
   a substantially vertical principal meridian curve,
   the far vision viewing zone having an optical center on the principal meridian curve and the near vision viewing zone having an optical center on the principal meridian curve,
   the curvature of the refractive surface changing between the optical center of the far vision viewing zone and the optical center of the near vision viewing zone in accordance with a prescribed law,
   the refractive surface being divided into the far vision viewing zone and the intermediate vision viewing zone by a first curve $C_1$ which meets the principal meridian curve at the optical center of the far vision viewing zone, and divided into the intermediate vision zone and the near vision viewing zone by a second curve $C_2$ which meets the principal meridian curve at the optical center of the near vision viewing zone,
   the refractive surface of the lens further comprising a refractive surface wherein an angle formed by a normal line to the surface from each point on an intersection of an arbitrary plane in parallel with the plane including the principal meridian curve of the refractive surface of the lens and a plane including the principal meridian curve changes in accordance with the same law as that of the curvature of the refractive surface in the intermediate viewing zone between the optical center of the far vision viewing zone and the near vision viewing zone on said principal meridian curve.

2. The ophthalmic lens of claim 1, wherein the boundary curve $C_1$ between the far vision viewing zone and the intermediate vision viewing zone is orthognal to the principal meridian curve.

3. The ophthalmic lens of claim 2, wherein the boundary curve $C_1$ between the far vision viewing zone and the intermediate vision viewing zone passes through the geometric center of the lens.

4. The ophthalmic lens of claim 1, wherein the boundary curve $C_2$ between the near vision viewing zone and the intermediate vision viewing zone is a substantially straight line on each side of the principal meridian curve with the peripheral portions dropping symmetrically with respect to the principal meridian curve.

5. The ophthalmic lens of claim 1, wherein the refractive surface of the lens in the far vision viewing zone is spherical.

6. The ophthalmic lens of claim 5, wherein the refractive surface in the near vision viewing zone is spherical.

7. The ophthalmic lens of claim 3, wherein the boundary curve $C_2$ between the near vision viewing zone and the intermediate vision viewing zone is a substantially straight line on each side of the principal meridian curve with the peripheral portions dropping symmetrically with respect to the principal meridian curve and the refractive surface of the lens in the far vision viewing zone and in the near vision viewing zone is spherical.

8. The ophthalmic lens of claim 1 or 7, wherein the change in curvature between the optical center of the far vision viewing zone and the optical center of the near vision viewing zone is constant except for the portion adjacent to the optical center of the far vision viewing zone and the optical center of the near vision viewing zone.

9. The ophthalmic lens of claim 5, wherein the refractive surface of the near vision viewing zone has an aspherical surface and said angle formed by a line normal to the surface and a plane including the principal meridian in the far vision viewing zone and in the near vision viewing zone is constant in the far zone and the near zone.

10. The ophthalmic lens of claim 1, wherein the refractive surface of the far vision viewing zone has an aspherical surface and said angle formed by a line normal to the surface and a plane including the principal meridian in the far vision viewing zone and in the near vision viewing zone is constant in the far zone and the near zone.

11. The ophthalmic lens of claim 10, wherein the refractive surface of the lens in the near vision viewing zone is an aspherical surface.

12. The ophthalmic lens of claim 1, wherein the intersection of a far vision plane at right angles to the principal meridian curve and the refractive surface of the lens in the far vision viewing zone has a circular shape having the same curvature as that of the principal meridian curve at the intersection of the plane and the principal meridian curve for a distance at least about 2.5 mm on both sides of said principal meridian curve, the remaining portion of the intersection being a non-circular shape having a curvature which increases as it becomes more distant from the principal meridian curve.

13. The ophthalmic lens of claim 1 or 12, wherein the intersection of a near vision plane at right angles to the principal meridian curve and the refractive surface of the lens in the near vision viewing zone has a circular shape having the same curvature as that of the principal meridian curve at the intersection of the near vision plane and the principal meridian curve for a distance at least about 1.5 mm on both sides of the principal meridian curve and the remaining portion of said intersection being a non-circular shape having a curvature which decreases as it becomes more distant from the principal meridian curve.

* * * * *